Sept. 6, 1960 J. ROBSON 2,951,765
COMBINED FOOD PACKAGING AND COOKING CONTAINER
Filed June 17, 1957
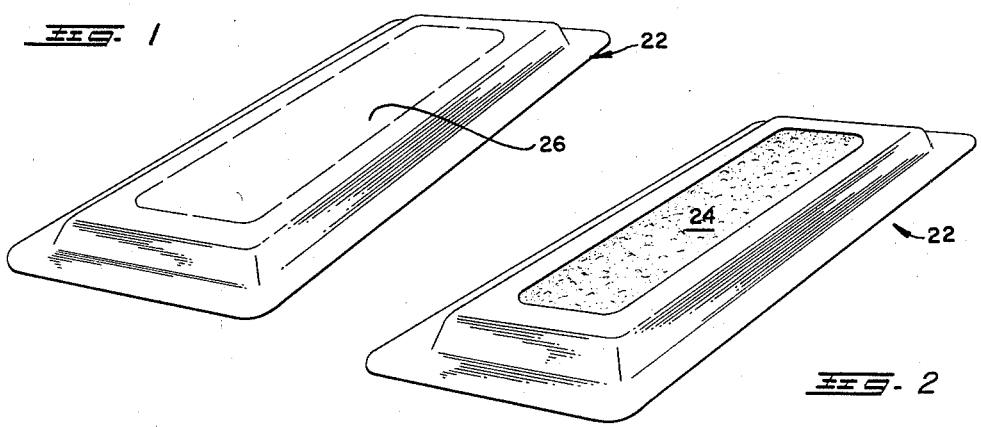
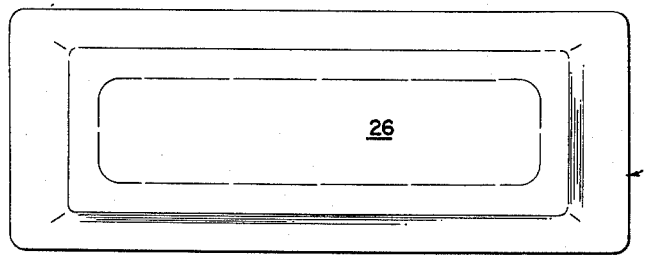
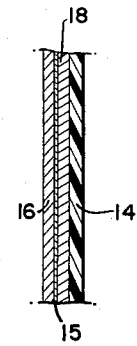
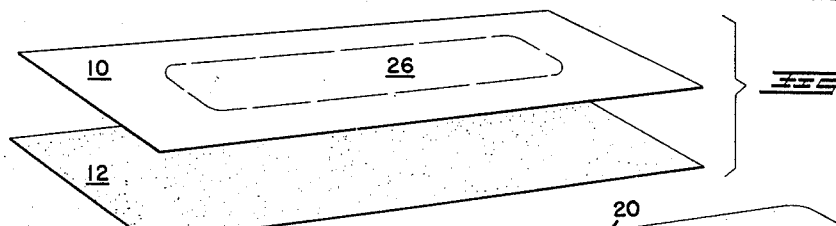
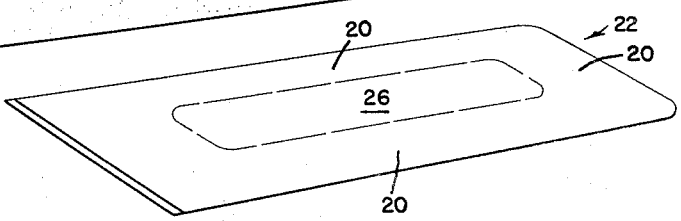
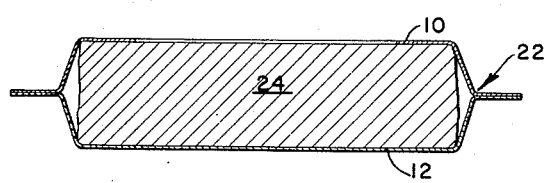
INVENTOR
JOHN ROBSON
By his attorneys
Glenn & Jackson United States Patent Office 2,951,765
Patented Sept. 6, 1960

2,951,765

COMBINED FOOD PACKAGING AND COOKING CONTAINER

John Robson, Richmond, Va., assignor to Reynolds Metals Company, Richmond, Va., a corporation of Delaware Filed June 17, 1957, Ser. No. 665,970

6 Claims. (Cl. 99—192)

This invention relates to means for packing and cooking food, and in particular relates to a disposable bag in which food may be packed and later broiled after removal of a detachable section of the bag.

There has been an increasing demand for food products packed for use with the least amount of time and effort. Part of the response to that demand has been the development of the frozen food industry. Another part of the response to that demand has been the development of improved containers for packing food, including the use of waxed paper, plastic films, aluminum foil, and various laminates of these materials, for wrapping foods. Paper has relatively good strength and low cost, but it is permeable, and deteriorates at high temperatures. Plastic film has the advantage, among others, of impermeability, but it is subject to deterioration at high temperatures. Aluminum foil can withstand high temperatures, and is bright and opaque, but it is susceptible to tearing, particularly if rolled to the thin gauges necessary for purposes of economy. As a result, it has become conventional to wrap foods with laminates of foil or film, or both, which wrap is later removed, before the food is cooked. In the case of frozen meat products, for example, the unwrapped meat is placed on an open pan and put in an oven near a flame or heater which broils the meat. Since the meat is exposed on all surfaces except the one in contact with the pan, its juices are rapidly expelled and evaporated, and consequently the broiled meat is relatively dry after cooking. In addition, the surface of the meat against the pan is apt to char and stick to the pan, and the juices which flow out over the pan also char on the pan, and cause trouble in cleaning up afterwards. These difficulties can be overcome by use of an aluminum foil wrap placed around the food before cooking, but it would be more convenient and economical to supply the food in a wrap which could go into the broiler with the food, instead of removing the original wrap, and putting on another wrap, before cooking. This has not been done heretofore, because it is usually not practicable to pack meat products solely in foil, and the heat of cooking has been considered an insuperable obstacle to putting in an oven a package of food wrapped in a laminate of foil with paper or film.

In accordance with the present invention, these difficulties can be overcome by making use of the moisture within the food to prevent deterioration of the nonmetallic inner liner of a foil envelope in which the food is initially packed and subsequently broiled, after removal of a detachable panel of the envelope. The invention makes use of the discovery that the nonmetallic inner liner, such as polyethylene, or a laminate of paper and polyethylene, will not char, and thereby adversely affect the flavor of the food, if the exposed edges around the detached panel are cut cleanly along nearly all of the length of the edge of the opening around the detached panel. The invention also makes use of the discovery that the size of the opening left by the detached panel must be smaller than the area of the food in the envelope adjacent the opening, after allowing for shrinkage during cooking, in order to insure that the moisture in the food which is evaporated inside the bag will be retained in the bag to a large extent during the broiling operation. By applying these principles in accordance with the invention, it is possible to use impermeable liners, such as polyethylene, which have melting points below that of the intended broiling temperatures, without danger of deterioration of the impermeable liner or danger of imparting any taste to the food as a result of such deterioration. The foil around the outside of the bag reflects heat to protect the liner, and also transmits heat to prevent local hot spots. In addition, the foil outer layer has a pleasing appearance, and makes the envelope attractive not only for purposes of packing the food initially, but also for purposes of serving the food to the consumer after broiling. The food can be served in the bag as well as cooked in it, and the bag is disposable after such service, which greatly simplifies the problem of cleaning up after a meal.

For a better understanding of the invention, and of its other objects and details, reference is now made, for purposes of illustration only, to the present preferred embodiment of the invention shown in the accompanying drawings. In the drawings:

Fig. 1 shows a perspective view of an envelope in which a block of frozen food is packaged in accordance with the invention;

Fig. 2 corresponds to Fig. 1 but shows the envelope after removal of a detachable panel to expose the packaged food;

Fig. 3 shows an enlarged top plan view of the envelope of Fig. 1;

Fig. 4 shows an enlarged cross-section of a portion of a laminated sheet from which the envelope of Figs. 1–3 is made;

Fig. 5 shows diagrammatically two sheets from which the envelope of Figs. 1–3 is made;

Fig. 6 shows the envelope of Figs. 1–3 before it has been filled; and

Fig. 7 is a section on the line VII—VII shown in Fig. 3.

Referring now more particularly to the drawings, Figure 5 shows two laminated sheets 10 and 12 each having an outer layer of metal foil 16, preferably aluminum, and an inner liner of impermeable organic resin film 14 (Fig. 4). Such foil may be of any ductile metal, but is preferably of soft aluminum. The foil must have sufficient thickness to enable it to conduct heat effectively, such as a minimum of about 0.002 inch in the case of aluminum foil. There is no critical upper limit of the thickness of the foil, which is governed by expense, and for the purposes of the invention the preferred thickness of the aluminum foil is about 0.003 inch to about 0.015 inch, inclusive. The film must be non-toxic, taste-free, and impermeable to water and grease. The thickness of the film is not critical, and may be in the order of one mil for example. The present preferred species of film is higher (e.g., over 5000) molecular weight polyethylene, but other films may be selected, such as vinyl resins and polymeric terephthalate esters (e.g., "Mylar"). As far as the function of the complete package is concerned, it is not essential that the film be thermoplastic as distinguished from thermosetting, but a thermoplastic film is preferred because it can be used to heat-seal the sheets of laminate to form the container of the invention.

As shown in Fig. 6, the two sheets 10 and 12 of Fig. 5 are superimposed with their film linings facing each other, and are sealed along the margins of three edges 20 by applying heat to said edges to fuse the film. That operation forms a pouch 22 which is open at one end. A block of frozen fish 24 (Fig. 7), for example, is inserted in the unsealed end of the pouch, and then the fourth side of the pouch is heat-sealed, to close the package.

As shown in Fig. 4, the present preferred laminate has an interlayer 18 of high wet-strength paper laminated between the layers of foil 16 and film 14, in order to allow the use of relatively thin gauges of foil and film, which are relatively expensive, without sacrificing the strength of the laminate as a whole. Also, the paper layer simplifies the problem of adhesion. The paper 18 is impregnated with a minor proportion of resin which is insoluble in water and resistant to weakening in the presence of greases. The resin binds enough fibers of the paper together to make the paper resistant to tearing after it has been exposed to moisture or grease or both. The present preferred examples of such wet strength resins, which are preferably present in proportions of about 1.2% to about 3% by weight of the paper, are melamine resins and urea-formaldehyde resins. Other resins can be selected by those skilled in the art. The present preferred example of such tissue is a tissue of bleached chemical wood pulp impregnated with a melamine resin, and weighing about 16.6 pounds per ream of 500 sheets each 24 x 36 inches. The paper is preferably machine glazed on one side (the side against the foil) to cause the other side of the foil to be smooth when it is printed.

A layer 15 of heat-resistant silicate adhesive secures the paper to the foil, and the polyethylene film is preferably secured to the paper by melting the polyethylene and extruding it directly onto the paper.

It is a prime purpose of the invention to enable the fish or other food product to be broiled in the package, and to that end a panel 26 is cut in the laminated sheet 10 (Fig. 5). A series of razor-like cuts are made in a closed loop defining the panel 26, and these cuts are interrupted by very small (about 19 mils wide) bridges of uncut material which hold the panel to the pouch when the package is packed, and until the contents of the package are to be cooked. Since the cuts would allow entry of air into the package, the invention contemplates placing an impermeable overwrap around the package after it has been packed. The overwrap may be of polyethylene, or other material, and it is contemplated that at least most of the printed matter on the package will be applied to the overwrap. When the contents of the package are to be cooked, the overwrap is removed, and then the panel, leaving the fish exposed for cooking in an attractive open container formed by the rest of the bag. It is contemplated that the block of fish will have seasoning sprinkled on its surface which will be exposed when the panel is removed, and that other seasoning will be applied to the part of the fish which is enclosed within the bag after the panel has been removed. Such seasoning and decoration are protected by the bag during transportation and storage, and it remains with the fish when it is cooked.

During the broiling operation the open package is preferably placed under a flame, which radiates heat toward the opening in the pouch and crisps the exposed surface of the fish, as well as cooking the whole block of fish as a result of conduction of heat from the exposed surface of the fish to the interior of the block, and by conduction of heat through the package into the enclosed portions of the fish in the pouch. The heat will evaporate some of the juices in the food adjacent its exposed surface, but most of the outer surface of the food is enclosed within the pouch, so that the juices exuded during cooking trickle down and collect at the bottom of the pouch. Some of these juices vaporize within the pouch, particularly around its sides, and any excess pressure of these vaporized juices is released by escape of the vapors between the upper surface of the food and the adjacent marginal portions of the package around the panel opening. All of the interior surface of the film lining of the package is thus exposed to liquids or vapors, which are necessarily at the temperature little if any above the boiling point of water (about 212° F.). These temperatures are below the melting point of the film selected for the lining (e.g., about 300° to about 350° F. in the case of polyethylene film). In addition, the capacity of the foil layer to conduct heat protects any local hot spots which might develop in the lining, particularly at the edges of the pouch around the panel opening, and the edges around the bag where it has been heat-sealed.

While I have illustrated and described the present preferred embodiment of the invention, and method of practicing the same, it will be recognized that it may be otherwise variously embodied and practiced within the scope of the following claims.

I claim:

1. A combined packaging and cooking container for food, said container having an interior cavity for receiving food, and a laminated sheet extending over said cavity and comprising an outer layer of bright reflective metal and an inner layer of thermoplastic film having a melting point substantially above the boiling point of water, said laminate having a series of relatively long and clearly defined slits penetrating entirely therethrough and extending entirely around a removable portion of said sheet with the edges of the film coinciding evenly with the edges of the metal on both sides of each slit, said portion of the sheet having narrow uncut integral connections with the remainder of the sheet between said slits, whereby it may be readily removed by tearing through said connections and substantially no portion of the underlying film is left exposed beyond the confines of the protective metal layer when the detachable portion is removed, and said portion being spaced inwardly from the outer periphery of said sheet, leaving the balance of the sheet extending entirely around and overlapping the cavity when said portion is removed, the film layer of the remaining portion of the sheet being protected from excessive heat during cooking by the outer reflective metal layer of the sheet and by the evaporation of juices in the food within the container.

2. A combined packaging and cooking container for food, said container having an interior cavity for receiving food, and a laminated sheet extending over said cavity and comprising an outer layer of bright reflective aluminum foil, an inner layer of polyethylene film having a melting point substantially above the boiling point of water, and an interlayer of paper, said laminate having a series of relatively long and clearly defined slits penetrating entirely therethrough and extending entirely around a removable portion of said sheet with the edges of the film coinciding evenly with the edges of the metal on both sides of each slit, said portion of the sheet having narrow uncut integral connections with the remainder of the sheet between said slits, whereby it may be readily removed by tearing through said connections and substantially no portion of the underlying film is left exposed beyond the confines of the protective metal layer when the detachable portion is removed, and said portion being spaced inwardly from the outer periphery of said sheet, leaving the balance of the sheet extending entirely around and overlapping the cavity when said portion is removed, the film layer of the remaining portion of the sheet being protected from excessive heat during cooking by the outer reflective metal layer of the sheet and by the evaporation of juices in the food within the container.

3. A combined packaging and cooking container for food, said container having an interior cavity for receiving food, and the interior of said container being bounded by an upper sheet and a lower sheet both comprising an outer layer of bright reflective metal laminated with an inner layer of thermoplastic film having a melting point substantially above the boiling point of water, said upper and lower sheets being heat-sealed together where the inner layers of the film are opposed along the peripheral edges of the sheets, said upper sheet having a series of relatively long and clearly defined slits penetrating entirely therethrough and extending entirely around a removable portion of said sheet with the edges of the film coinciding evenly with the edges of the metal on both sides of each slit, said portion of the sheet having narrow uncut integral connections with the remainder of the sheet between said slits, whereby it may be readily removed by tearing through said connections and substantially no portion of the underlying film is left exposed beyond the confines of the protective metal layer when the detachable portion is removed, and said portion being spaced inwardly from the outer periphery of said sheet, leaving the balance of the sheet extending entirely around and overlapping the cavity when said portion is removed, the film layer of the remaining portion of the sheet being protected from excessive heat during cooking by the outer reflective metal layer of the sheet and by the evaporation of juices in the food within the container.

4. A combined packaging and cooking container for food, and a generally rectangular block of juice-containing frozen food in the container, said container having an interior cavity for receiving food, and a laminated sheet extending over said cavity and comprising an outer layer of bright reflective metal and an inner layer of thermoplastic film having a melting point substantially above the boiling point of water, said laminate having a series of relatively long and clearly defined slits penetrating entirely therethrough and extending entirely around a removable portion of said sheet with the edges of the film coinciding evenly with the edges of the metal on both sides of each slit, said portion of the sheet having narrow uncut integral connections with the remainder of the sheet between said slits, whereby it may be readily removed by tearing through said connections and substantially no portion of the underlying film is left exposed beyond the confines of the protective metal layer when the detachable portion is removed, said block of food having a substantially greater breadth and width of its upper surface than the corresponding breadth and width of the detachable portion of the sheet covering said surface, and said portion being spaced inwardly from the outer periphery of said sheet, leaving the balance of the sheet extending entirely around and overlapping the cavity when said portion is removed, the film layer of the remaining portion of the sheet being protected from excessive heat during cooking by the outer reflective metal layer of the sheet and by the evaporation of juices in the food within the container.

5. A combined packaging and cooking container for food, and a generally rectangular block of juice-containing frozen food in the container, said container having an interior cavity for receiving food, and the interior of said container being bounded by an upper sheet and a lower sheet both comprising an outer layer of bright reflective metal laminated with an inner layer of thermoplastic film having a melting point substantially above the boiling point of water, said upper and lower sheets being heat-sealed together where the inner layers of the film are opposed along the peripheral edges of the sheets, said upper sheet having a series of relatively long and clearly defined slits penetrating entirely therethrough and extending entirely around a removable portion of said sheet with the edges of the film coinciding evenly with the edges of the metal on both sides of each slit, said portion of the sheet having narrow uncut integral connections with the remainder of the sheet between said slits, whereby it may be readily removed by tearing through said connections and substantially no portion of the underlying film is left exposed beyond the confines of the protective metal layer when the detachable portion is removed, said block of frozen food having a substantially greater breadth and width of its upper surface than the corresponding breadth and width of the detachable portion, the thickness of said food being so related to the expansible height of said container that a sealing contact is established between the food and the sheet extending over said surface in the area adjacent to said removable portion, and said portion being spaced inwardly from the outer periphery of said sheet, leaving the balance of the sheet extending entirely around and overlapping the cavity when said portion is removed, the film layer of the remaining portion of the sheet being protected from excessive heat during cooking by the outer reflective metal layer of the sheet and by the evaporation of juices in the food within the container.

6. A combined packaging and cooking container for food, and a generally rectangular block of juice-containing frozen food in the container, said container having an interior cavity for receiving food, and a laminated sheet extending over said cavity and comprising an outer layer of bright reflective metal and an inner layer of thermoplastic film having a melting point substantially above the boiling point of water, said laminate having a series of relatively long and clearly defined slits penetrating entirely therethrough and extending entirely around a removable portion of said sheet with the edges of the film coinciding evenly with the edges of the metal on both sides of each slit, said portion of the sheet having narrow uncut integral connections with the remainder of the sheet between said slits, whereby it may be readily removed by tearing through said connections and substantially no portion of the underlying film is left exposed beyond the confines of the protective metal layer when the detachable portion is removed, said block of food having a substantially greater breadth and width of its upper surface than the corresponding breadth and width of the detachable portion of the sheet covering said surface, the thickness of said food block being so related to the height of said container that a liquid seal is developed between the food and said covering sheet, and said portion being spaced inwardly from the outer periphery of said sheet, leaving the balance of the sheet extending entirely around and overlapping the cavity when said portion is removed, the film layer of the remaining portion of the sheet being protected from excessive heat during cooking by the outer reflective metal layer of the sheet and by the evaporation of juices in the food within the container.

References Cited in the file of this patent

UNITED STATES PATENTS

| | | |
|---|---|---|
| 2,242,711 | Oliver | May 20, 1941 |
| 2,400,390 | Clunan | May 14, 1946 |
| 2,760,630 | Lakso | Aug. 28, 1956 |
| 2,777,601 | Cheeley | Jan. 15, 1957 |

OTHER REFERENCES

Food Engineering, June 1951, p. 109.
Food Packer, November 1956, p. 40.